US009185878B2

(12) United States Patent
Kuras et al.

(10) Patent No.: US 9,185,878 B2
(45) Date of Patent: Nov. 17, 2015

(54) SCOOPABLE CAT LITTER WITH IMPROVED CLUMP STRENGTH

(71) Applicant: Oil-Dri Corporation of America, Chicago, IL (US)

(72) Inventors: Monika Kuras, Chicago, IL (US); Donata Ostapyshyn, Chicago, IL (US); G. Robert Goss, Chicago, IL (US); Robert Soral, Chicago, IL (US); J. T. Harrison, Chicago, IL (US)

(73) Assignee: Oil-Dri Corporation of America, Chicago, IL (US)

( * ) Notice: Subject to any disclaimer, the term of this patent is extended or adjusted under 35 U.S.C. 154(b) by 2 days.

(21) Appl. No.: 14/012,153

(22) Filed: Aug. 28, 2013

(65) Prior Publication Data

US 2014/0000526 A1 Jan. 2, 2014

Related U.S. Application Data

(63) Continuation-in-part of application No. 13/524,021, filed on Jun. 15, 2012.

(60) Provisional application No. 61/497,178, filed on Jun. 15, 2011, provisional application No. 61/694,000, filed on Aug. 28, 2012.

(51) Int. Cl.
*A01K 1/01* (2006.01)
*A01K 1/015* (2006.01)

(52) U.S. Cl.
CPC ............ *A01K 1/0107* (2013.01); *A01K 1/0154* (2013.01); *A01K 1/0155* (2013.01)

(58) Field of Classification Search
CPC .. A01K 1/0155; A01K 1/0154; A01K 1/0152
USPC ................... 119/173, 171, 161, 174
See application file for complete search history.

(56) References Cited

U.S. PATENT DOCUMENTS

| | | | |
|---|---|---|---|
| 2,531,427 A | 11/1950 | Hauser |
| 3,586,478 A | 6/1971 | Neumann |
| 3,789,797 A | 2/1974 | Brewer |
| 5,000,115 A | 3/1991 | Hughes |
| 5,094,189 A | 3/1992 | Aylen et al. |
| 5,129,365 A | 7/1992 | Hughes |
| 5,176,107 A | 1/1993 | Buschur et al. |
| 5,188,064 A | 2/1993 | House |
| 5,317,990 A | 6/1994 | Hughes |
| 5,359,961 A | 11/1994 | Goss |
| 5,386,803 A | 2/1995 | Hughes |
| 5,458,091 A | 10/1995 | Pattengill |
| 5,503,111 A | 4/1996 | Hughes |
| 5,577,463 A | 11/1996 | Elazier-Davis et al. |
| 5,826,543 A | 10/1998 | Raymond et al. |
| 5,836,263 A | 11/1998 | Goss et al. |
| 5,901,661 A | 5/1999 | Pattengill |
| 5,970,916 A | 10/1999 | Yoder |
| 5,975,019 A | 11/1999 | Goss et al. |
| 6,089,189 A | 7/2000 | Goss et al. |
| 6,662,749 B1 | 12/2003 | Wiedenhaft |
| 6,872,275 B2 | 3/2005 | Ko et al. |
| 7,124,710 B2 | 10/2006 | Weaver |
| 7,343,874 B2 | 3/2008 | Deleeuw et al. |
| 7,527,019 B2 | 5/2009 | Burckbuchler |
| 7,665,418 B2 | 2/2010 | Bracilovic |
| 2003/0209203 A1 | 11/2003 | Opfel |
| 2005/0005870 A1 | 1/2005 | Fritter |
| 2005/0056229 A1 | 3/2005 | Greene et al. |
| 2005/0175577 A1 | 8/2005 | Jenkins et al. |
| 2007/0289543 A1 | 12/2007 | Petska et al. |
| 2012/0260860 A1 | 10/2012 | Drief et al. |
| 2014/0000526 A1 | 1/2014 | Kuras et al. |

FOREIGN PATENT DOCUMENTS

| | | |
|---|---|---|
| EP | 0378421 | 7/1990 |
| GB | 2082614 | 3/1982 |
| WO | WO 98/37149 | 8/1998 |

OTHER PUBLICATIONS

R. Jain-Raina, et al., Evaluation of Blends of Alternative Gelling Agents With Agar and Development of Xanthagar, A Gelling Mix, Suitable for Plant Tissue Culture Media, Asian Journal of Biotechnology (2011) vol. 3, No. 2, p. 153-164.
International Preliminary Report on Patentability and Written Opinion of the International Searching Authority dated Mar. 3, 2015, which issued during prosecution of International Application No. PCT/US2013/057005.
Henry F. Zobel et al. "Starch: Structure, Analysis and Application" Food Polysaccharides and Their Applications Alistair M. Stephen ed. 1995.
Third Party Submission under 37 CFR 1.290 of U.S. Appl. No. 14/012,153.
Petition for Inter Partes Review of U.S. Pat. No. 5,975,019 pursuant to 37 C.F.R. §42.100 et seq.
Rejection of U.S. Appl. No. 08/914,406 dated Jan. 29, 1999.
Terminal Disclaimer for U.S. Appl. No. 08/914,406 dated Apr. 29, 199.
Notice of Allowability for U.S. Appl. No. 08/914,406 dated May 21, 1999.
Declaration of John Hughes dated Nov. 12, 2014.
U.S. Sieve Series Chart.
Proof of Service.
1997 Merriam Webster definition of "Particulate".
1997 Merrian Webster definition of "Arithmetic Mean".
Stedman's Medical Dictionary definition of "Plantago" (26th ed. 1995).

*Primary Examiner* — Yvonne Abbott-Lewis
(74) *Attorney, Agent, or Firm* — Vedder Price P.C.; Deborah L. Lu; Mark W. Russell

(57) ABSTRACT

The present invention relates to sodium carboxylmethylcellulose (CMC), xanthan gum or combinations thereof and uses thereof, particularly as a clumping additive for cat litter.

19 Claims, No Drawings

US 9,185,878 B2

SCOOPABLE CAT LITTER WITH IMPROVED CLUMP STRENGTH

RELATED APPLICATIONS AND INCORPORATION BY REFERENCE

This application is a continuation in part of U.S. patent application Ser. No. 13/524,021 filed Jun. 15, 2012 which published as US patent publication 20120318205 on Dec. 20, 2012, which claims benefit of priority to U.S. provisional patent application No. 61/497,178 filed Jun. 15, 2011.

This application claims benefit of priority to U.S. provisional patent application Ser. No. 61/694,000 filed Aug. 28, 2012.

Reference is also made to U.S. Pat. No. 5,836,263 issued Nov. 17, 1998 and U.S. Pat. No. 5,836,263 issued Nov. 2, 1999.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention relates to clumping additives for cat litter products.

BACKGROUND OF THE INVENTION

In the past, much time, effort, and other valuable resources, have been expended in the development of animal litter, particularly for household pets, and especially cats. A material most widely utilized in animal litter is generally clay.

Clay particles provide small animals with dry, sanitary, dustless and relatively odorless litter. Through formational mismatching and distortion between the tetrahedral layers and impurities, diverse morphological and chemical properties are conferred to the clay. The absorption of liquid, particularly water, is one such phenomenon. The irregular series of layers with corresponding interstitial space comprise pores. It is those spaces and pores which give clay its capacity to absorb and store water or liquid waste. Sodium bentonite, a swelling clay, is a clay that naturally forms clumps around wetted litter to permit easy and selective removal. Clumps of wetted litter permit easy and selective removal of odor-producing liquid animal wastes for convenient disposal without having to replace the entire litter bed. Despite this advantage, sodium bentonite brings with it many disadvantages, chief among them that sodium bentonite is not optimal for odor control, the product is heavy, found primarily in Wyoming and thus is geographically undesirable, and can clog pipes if introduced into a typical residential plumbing system.

At least partly to match the convenience of sodium bentonite but to avoid various downsides of the ingredient, clumping agents have been devised which, when added to a bed containing non-swelling particles, cause the particles to clump together into an agglomeration of sufficient size and strength to be removed by a sieving spoon. Some prior art clumping agents include inorganic salts, such as anhydrous sodium sulfate, gypsum and the like, but these materials do not naturally degrade, can form insoluble hard water salts in household waste systems and thus are environmentally unacceptable.

Other clumping agents used in the prior art include water-soluble gums, dry particulate cellulosic ethers and water-absorbent polymers. However, these additives require careful handling during manufacture, multiple processing steps and are costly. Further, in such animal litter, the dry particulate cellulosic ethers or the water-absorbent polymers tend to segregate from the particulate clay during handling and shipping.

There is a need in the art for improved clumping agents.

Citation or identification of any document in this application is not an admission that such document is available as prior art to the present invention.

SUMMARY OF THE INVENTION

Applicants' search for clumping agents as alternatives to guar gum has yielded two alternatives that have been shown to create or improve the clumping properties of scoopable cat litter. These are sodium carboxymethylcellulose (CMC) and xanthan gum, whose use is unexpected in cat litter formulations. Further, each has specific requirements to achieve an optimum clump strength (<2.0), for CMC a viscosity of $\geq 2000$ cPs and average particle size of $\leq 188$ microns and for xanthan gum a viscosity of $\geq 2000$ cPs and an average particle size of $\leq 54$ microns.

Both CMC and xanthan gum were shown to be effective and stable when used with a wide variety of substances customarily used for litter products, preferably bentonite-montmorillonite clay, attapulgite/palygorskite clay and opalaceous material (opaline silica or Antelope shale) clay (also known as Blue Mountain, Ga. and Taft clays, respectively) and also including sodium bentonite and paper granules. Both additives were also effective in increasing the clump strength of blended products, including a sodium bentonite and/or calcium bentonite blend.

The present invention relates to a clumping cat litter which may comprise sodium carboxymethylcellulose (CMC) and/or xanthan gum. The litter may comprise about 1% w/w CMC and/or 1% xanthan gum. In the alternative, if the litter comprises a sodium bentonite and/or calcium bentonite blend, the litter may comprise about 0.25% w/w CMC and/or 0.25% xanthan gum.

In one embodiment, the CMC may be selected from the group consisting of CMC with a minimum viscosity of 2000 cPs and a particle size less than or equal to 188 microns.

In another embodiment, the xanthan gum may be selected from the group consisting of Xanthan Gum with a minimum viscosity of 2000 cPs and a particle size less than or equal to 54 microns.

The present invention also relates to methods of creating or improving clumping in cat litter which may comprise adding sodium carboxymethylcellulose (CMC) and/or xanthan gum to the cat litter, wherein the clumping is created or improved as compared to a cat litter without sodium carboxymethylcellulose (CMC) and/or xanthan gum.

Accordingly, it is an object of the invention to not encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. §112, first paragraph) or the EPO (Article 83 of the EPC), such that Applicants reserve the right and hereby disclose a disclaimer of any previously described product, process of making the product, or method of using the product.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

DETAILED DESCRIPTION OF THE INVENTION

The present invention relates to a clumping cat litter which may comprise sodium carboxymethylcellulose (CMC). CMC is a cellulose derivative with carboxymethyl groups bound to some of the hydroxyl groups of the glucopyranose monomers that make up the cellulose backbone and is often used as its sodium salt, sodium carboxymethyl cellulose.

Advantageously, the CMC may have a viscosity greater than or equal to 2000 cPs.

In another embodiment, the CMC may have an average particle size less than or equal to 188 microns.

In a preferred embodiment, the litter may comprise about 0.10%, about 0.15%, about 0.20%, about 0.25%, about 0.30%, about 0.35%, about 0.40%, about 0.45%, about 0.50%, about 0.55%, about 0.60%, about 0.65%, about 0.70%, about 0.75%, about 0.80%, about 0.85%, about 0.90%, about 0.95%, about 1.00%, about 1.05%, about 1.10%, about 1.15%, about 1.20%, about 1.25%, about 1.30%, about 1.35%, about 1.40%, about 1.45%, about 1.50%, about 1.55%, about 1.60%, about 1.65%, about 1.70%, about 1.75%, about 1.80%, about 1.85%, about 1.90%, about 1.95%, about 2.00%, about 2.10%, about 2.15%, about 2.20%, about 2.25%, about 2.30%, about 2.35%, about 2.40%, about 2.45%, about 2.50%, about 2.55%, about 2.60%, about 2.65%, about 2.70%, about 2.75%, about 2.80%, about 2.85%, about 2.90%, about 2.95%, about 3.00%, about 3.05%, about 3.10%, about 3.15%, about 3.20%, about 3.25%, about 3.30%, about 3.35%, about 3.40%, about 3.45%, about 3.50%, about 3.55%, about 3.60%, about 3.65%, about 3.70%, about 3.75%, about 3.80%, about 3.85%, about 3.90%, about 3.95%, about 4.00%, about 4.10%, about 4.15%, about 4.20%, about 4.25%, about 4.30%, about 04.35%, about 4.40%, about 4.45%, about 4.50%, about 4.55%, about 4.60%, about 4.65%, about 4.70%, about 4.75%, about 4.80%, about 4.85%, about 4.90%, about 4.95% or about 5.00% w/w of CMC.

In an advantageous embodiment, the CMC of the present invention may have varying viscosities and/or particle sizes, such as but not limited to, viscosities of 2000 cPs, 4450 cPs or 5710 cPs and/or average particle sizes of 49μ, 55μ or 65μ.

The clumping cat litter of the present invention may also comprise xanthan gum. Advantageously, the xanthan gum may have a viscosity greater or equal to 2000 cPs and an average particle size of less than or equal to 54μ.

In a preferred embodiment, the litter may comprise about 0.10%, about 0.15%, about 0.20%, about 0.25%, about 0.30%, about 0.35%, about 0.40%, about 0.45%, about 0.50%, about 0.55%, about 0.60%, about 0.65%, about 0.70%, about 0.75%, about 0.80%, about 0.85%, about 0.90%, about 0.95%, about 1.00%, about 1.05%, about 1.10%, about 1.15%, about 1.20%, about 1.25%, about 1.30%, about 1.35%, about 1.40%, about 1.45%, about 1.50%, about 1.55%, about 1.60%, about 1.65%, about 1.70%, about 1.75%, about 1.80%, about 1.85%, about 1.90%, about 1.95%, about 2.00%, about 2.10%, about 2.15%, about 2.20%, about 2.25%, about 2.30%, about 2.35%, about 2.40%, about 2.45%, about 2.50%, about 2.55%, about 2.60%, about 2.65%, about 2.70%, about 2.75%, about 2.80%, about 2.85%, about 2.90%, about 2.95%, about 3.00%, about 3.05%, about 3.10%, about 3.15%, about 3.20%, about 3.25%, about 3.30%, about 3.35%, about 3.40%, about 3.45%, about 3.50%, about 3.55%, about 3.60%, about 3.65%, about 3.70%, about 3.75%, about 3.80%, about 3.85%, about 3.90%, about 3.95%, about 4.00%, about 4.10%, about 4.15%, about 4.20%, about 4.25%, about 4.30%, about 04.35%, about 4.40%, about 4.45%, about 4.50%, about 4.55%, about 4.60%, about 4.65%, about 4.70%, about 4.75%, about 4.80%, about 4.85%, about 4.90%, about 4.95% or about 5.00% w/w of xanthan gum.

In an advantageous embodiment, the xanthan gum may have varying viscosities and/or particle sizes, such as but not limited to, viscosities of 2000 cPs or 2390 cPs and/or average particle sizes of 46μ or 54μ.

The present invention provides for the addition of CMC and/or xanthan gum to any cat litter, in particular discrete particles or granules. In one embodiment, the CMC and/or xanthan gum may be added to a clay based or non-clay based cat litter. Examples of non-clay based cat litter includes, but are not limited to, wood fiber litter, cellulose litter, wheat litter, corn litter, paper litter and/or ash litter.

In one embodiment, the litter is a clay litter. In this embodiment, smectites may be particularly well suited as the particulate non-swelling constituent for the present purposes. The smectite family of clays includes the various mineral species montmorillonite (in particular a bentonite-montmorillonite clay), nontronite, hectorite and saponite, all of which can be present in the clay mineral in varying amounts. These clays may range in color from a cream or grey off-white to a dark reddish tan color. These clays may also contain calcium and/or magnesium in the form of exchangeable cations. Other preferred clays may include an attapulgite/palygorskite clay or an opalaceous material/opaline silica clay.

In an embodiment where the litter is a clay litter, the clay constituent of the present compositions may be in the form of discrete particles. These particles may be angular or rounded. Although particle sizes up to about 1 inch are suitable, a preferred size of clay particles may be in the range of about 4 by about 60 mesh, U.S. Sieve Series. For a tabulation of U.S. Sieve Series screen nomenclature, see Perry's Chemical Engineering Handbook, 6th Ed., McGraw-Hill, Inc., New York, N.Y. (1984), p21-15 (table 21-6). An especially preferred size range for the clay particles in the present invention may be in the range of about 18 to about 60 mesh.

Within the preferred particle size ranges, the clay particle size may be manipulated as a means of modulating the contours of the clump that is produced upon contact with an aqueous liquid. Relatively flatter, thinner clumps are more easily located by probing the animal litter with, for example, a sieving spoon than are spheroidal clumps of similar volume. On the other hand, thinner clumps are more subject to breakage. The particle size distribution of the clay particles may therefore be tailored to a preference held by a particular group of consumers. For relatively thinner, flatter clumps, a particle size of about 20 mesh by 60 mesh, U.S. Sieve Series, is preferred. On the other hand, for relatively heavier, spheroidal clumps, a relatively coarser particle size in the range of about 4 by 20 mesh, U.S. Sieve Series, is preferred. In the present invention, the size range of the swelling clay preferably is in the range of about 16 to about 50 and for the non-swelling clay preferably is in the range of about 18 to about 60 mesh.

In another embodiment, the litter of the present invention may comprise sodium bentonite and/or calcium bentonite (see, e.g., U.S. Pat. Nos. 5,836,263 and 5,836,263 and US Patent Publication 20120318205).

In one embodiment, the present invention provides a litter comprising sodium bentonite and calcium bentonite in which only the calcium bentonite particles are coated in polytetrafluoroethylene (PTFE) as a dedusting agent. Because clumpability for litters comprising mixtures of sodium bentonite with a filler, such as calcium bentonite, is dependent on the total external surface area of the sodium bentonite particles in the litter, by applying a PTFE coating to only the calcium bentonite particles, in one embodiment the present invention provides a litter that is low in dust while not substantially reducing the clumpability of the litter.

While not being bound by theory, CMC, advantageously sodium CMC, is particularly preferred for the present invention because it is postulated that CMC does not interfere with the dedusting functionality of the agent.

In one embodiment, the present invention provides a litter product blend of sodium bentonite and calcium bentonite in which 90% of the sodium bentonite particles have a particle size of between 345 and 1695 μm and 90% of the calcium bentonite particles have a particle size of between 626 and 1695 μm. In one embodiment of the present invention, the sodium bentonite particles have an average size of between 450 and 1000 μm and the calcium bentonite particles have an average range between 650 and 2000 μm.

In one embodiment, the present invention provides a litter product comprising a mixture of sodium bentonite and one or more fillers that has emissions of ammonia when exposed to urine that are less than for sodium bentonite alone.

In one embodiment, the present invention provides a litter product comprising sodium bentonite and one or more filler materials, in which the litter product has similar clumpability properties to sodium bentonite of the litter while being less dense than the sodium bentonite alone. In one embodiment, the present invention provides a clumpable litter product employing a cellulose-containing filler material to minimize the amount of sodium bentonite used while still providing clumpability similar to sodium bentonite of the litter.

In one embodiment of the present invention, the sodium bentonite used in a litter mixture may have a bulk density of 60 to 75 lbs/ft$^3$.

In one embodiment of the present invention, the calcium bentonite used in a litter mixture may have a bulk density of 35 to 45 lbs/ft$^3$.

In one embodiment of the present invention, a sodium bentonite/calcium bentonite blend used in a litter may have a bulk density of 50 to 58 lbs/ft$^3$. In one embodiment of the present invention, a sodium bentonite/calcium bentonite blend may be sufficiently uniform that differences in the bulk density throughout the blend are 2.0 lbs/ft$^3$, or 0.97 lbs/ft$^3$, or 0.96 lbs/ft$^3$, or even 0.74 lbs/ft$^3$, for 10 samples of the blend.

In addition to calcium bentonite, other materials that may be used in litter compositions of the present invention include Taft clay, smectites, attapulgite (palygorskite), fuller's earth, diatomaceous earth, kaolinite, sepiolite, zeolite, vermiculite, pumice, perlite, gypsum, beads (polyethylene, polystyrene, polypropylene, glass, silica gel), cloth, cotton, straw, cellulose, bark, poultry litter, reconstituted materials and combinations of materials such as mineral cellulose and light weight fertilizer, recycled wastes such as Milorganite, organic material such as barley grains, corn kernels, wheat grains, coffee beans, rice grains, nut shells, paper, wood fiber, wood pulp, wood shavings, wood chips, wood flour, sawdust, etc., pieces and parts thereof, reconstituted parts thereof and mixtures thereof. In one embodiment, filler materials of the present invention may have a bulk density of less than of the sodium bentonite in a litter mixture. In one embodiment, a filler of the present invention may be a granular filler.

Litter compositions of the present invention may include dedusting agents. Examples of dedusting agents that may be included in a litter composition of the present invention include polytetrafluoroethylene (PTFE), oils, water, glycerols, glycols, polyvinyl alcohol, polyvinyl acetate, polymers, silicones, calcium chloride, foams, etc.

While not being bound by theory, CMC, advantageously sodium CMC, is particularly preferred for the present invention because it is postulated that CMC does not interfere with the dedusting functionality of the agent.

In one embodiment of the present invention in which calcium bentonite particles are used as a filler material, a 1.2% slurry of PTFE in water may be sprayed onto the calcium bentonite particles at the application rate of 40 lbs/ton of calcium bentonite (0.48 lbs. active PTFE per ton of calcium bentonite). The PTFE coated calcium bentonite is later blended with sodium bentonite.

A litter of the present invention may include various other additives such as odor control additives, odor masking agents, emulsifiers, fixatives, indicators, pesticides, insecticides, herbicides, attractants, repellants, sanitizers, emollients, humectants, dessicants, dyes, pigments, etc.

Examples of odor control additives that may be included in a litter composition of the present invention include biocides, urease inhibitors, iodine, chlorophyllin sodium copper salts, probiotics, enzymes, baking soda, carbon, zeolites, salts, aldehydes (benzaldehyde, heptaldehyde, undecalcatone, benzyl cinnamate, cinnamaldehyde, citral, vanillin, coumarin, undecanal, etc.). In an advantageous embodiment, CMC is preferred because, while not being bound by theory, it is postulated that CMC does not interfere with the activity of any of these agents.

Examples of odor masking agents that may be included in a litter composition of the present invention include fragrances such as citrus, floral (lavender), green, fruity, herbaceous, musk, oriental, woody, etc.

Examples of emulsifiers that may be included in a litter composition of the present invention include: polysorbate 20, polysorbate 80, block copolymers such as Lutrol® and nonionic solubilizers such as Cremophor®.

Examples of fixatives that may be included in a litter composition of the present invention include polypropylene glycol, polypropylene glycol, polyethylene glycols, glycerin, sugar alcohols, etc.

Examples of indictors that may be included in a litter composition of the present invention include pH indicators, ammonia indicators, etc. that change color to indicate a change in pH, the presence of ammonia, etc.

Examples of attractants that may be included in a litter composition of the present invention include pheromones, catnip, etc.

Examples of repellants that may be included in a litter composition of the present invention include flea repellants, tick repellants, mite repellants, etc.

Examples of sanitizers that may be included in a litter composition of the present invention include alcohols, chlorhexidine gluconate, phenols, iodine, quaternary salts, ammonium compounds, hydrogen peroxide, urea hydrogen peroxide, sodium perchlorate, etc.

Examples of dessicants that may be included in a litter composition of the present invention include calcium sulfate, calcium chloride, silica gel, etc.

The present invention may also comprise additional clumping additives in addition to CMC and xanthan gum such as but not limited to other polysaccharides, Arabic gum, karaya gum, tara gum, ghatti gum, guar gum, galactomannan gum, locust bean gum, cellulose ester or ether, hydroxypropylmethyl cellulose, hydroxybutylmethyl cellulose, methyl cellulose, polyelectrolyte, xanthan gum, alginates, carrageenan gums, pectins, starches, psyllium husk powder, corn flour, pre-gelatinized corn flour, polyvinyl alcohol, polymers, copolymers and/or modified starches.

In particular, the clumping additive must be safe and non-toxic for animals. For example, the clumping additive of the present invention may be inhaled or ingested by the animal without any deleterious side effects.

The present invention also encompasses methods of improving clumping in cat litter comprising adding sodium carboxymethylcellulose (CMC) and/or xanthan gum to the cat litter, wherein the clumping is improved as compared to a cat litter without sodium carboxymethylcellulose (CMC) and/or xanthan gum, wherein the cat litter with the CMC and/or xanthan gum has improved clump strength as compared to a cat litter without CMC and/or xanthan gum.

For purposes of the present invention, the term "clump strength" refers to the numerical value of average clump strength for a clump of litter material formed by exposing the litter material to a wetting agent approximating urine. The clump strength of a litter material may be determined using one of the clump strength test procedures described below. These procedures include the Standard Drop Method Test and Extreme Drop Method Test described below, as well as other procedures for determining clump strength.

In a Standard Drop Method Test, to measure clump strength of litter formulations an aluminum pan may be placed under a dropping device. The aluminum pan may include one or more sheets of paper product, such as a paper towel, as a liner. A small depression, approximately 1 cm, may be made in a flat pile of a litter to be tested. 20 ml of a wetting agent may be poured over the test litter. After 30 seconds a clump may be removed from the test litter and placed on a swinging platform of a dropping device with the bottom side of the clump down. Prior to the clump being placed on the swinging platform, the swinging platform may be raised by a user to be horizontal relative to the inner horizontal surface of the pan. The user releases the swinging platform allowing the clump to free fall into an aluminum pan placed exactly 12 inches (30.5 cm) below. Next, the clump is visually examined for breakage and assigned a rating on a scale from 1 to 3:1: clump intact, no breakage; 2: slight breakage (clumps breaks into 2 pieces); and 3: moderate breakage (clump breaks into more than 2 pieces). The test may be repeated on 2 more clumps and the average rating of all 3 clumps is reported.

In an Extreme Drop Method Test, to measure clump strength of litter formulations an aluminum pan is placed under a dropping device. A small depression, approximately 1 cm may be made in a flat pile of a litter to be tested. 20 ml of synthetic urine is poured over the test litter. After 30 seconds a clump may be carefully removed from the test litter and placed on a swinging platform of a dropping device with the bottom side of the clump down. Prior to the clump being placed on the swinging platform, the swinging platform may be raised by a user to be horizontal relative to the inner horizontal surface of the pan. The user releases swinging platform allowing the clump to free-fall into an aluminum pan placed exactly 47 inches (119.4 cm) below. Next, the clump is visually examined for breakage and assigned a rating on a scale from 1 to 3:1: clump intact, no breakage; 2: slight breakage (clumps breaks into 2 pieces); and 3: moderate breakage (clump breaks into more than 2 pieces). The test may be repeated on 2 more clumps and the average rating of all 3 clumps is reported.

Advantageously, the CMC may have a viscosity greater than or equal to 2000 cPs.

In another embodiment, the CMC may have an average particle size less than or equal to 188 microns.

In a preferred embodiment, the litter may comprise about 0.10%, about 0.15%, about 0.20%, about 0.25%, about 0.30%, about 0.35%, about 0.40%, about 0.45%, about 0.50%, about 0.55%, about 0.60%, about 0.65%, about 0.70%, about 0.75%, about 0.80%, about 0.85%, about 0.90%, about 0.95%, about 1.00%, about 1.05%, about 1.10%, about 1.15%, about 1.20%, about 1.25%, about 1.30%, about 1.35%, about 1.40%, about 1.45%, about 1.50%, about 1.55%, about 1.60%, about 1.65%, about 1.70%, about 1.75%, about 1.80%, about 1.85%, about 1.90%, about 1.95%, about 2.00%, about 2.10%, about 2.15%, about 2.20%, about 2.25%, about 2.30%, about 2.35%, about 2.40%, about 2.45%, about 2.50%, about 2.55%, about 2.60%, about 2.65%, about 2.70%, about 2.75%, about 2.80%, about 2.85%, about 2.90%, about 2.95%, about 3.00%, about 3.05%, about 3.10%, about 3.15%, about 3.20%, about 3.25%, about 3.30%, about 3.35%, about 3.40%, about 3.45%, about 3.50%, about 3.55%, about 3.60%, about 3.65%, about 3.70%, about 3.75%, about 3.80%, about 3.85%, about 3.90%, about 3.95%, about 4.00%, about 4.10%, about 4.15%, about 4.20%, about 4.25%, about 4.30%, about 04.35%, about 4.40%, about 4.45%, about 4.50%, about 4.55%, about 4.60%, about 4.65%, about 4.70%, about 4.75%, about 4.80%, about 4.85%, about 4.90%, about 4.95% or about 5.00% w/w of CMC.

In an advantageous embodiment, the CMC of the present invention may have varying viscosities and/or particle sizes, such as but not limited to, viscosities of 2000 cPs, 4450 cPs or 5710 cPs and/or average particle sizes of 49μ, 55μ or 65μ.

The clumping cat litter of the present invention may also comprise xanthan gum. Advantageously, the xanthan gum may have a viscosity greater than or equal to 2000 cPs and an average particle size of less than or equal to 54 microns.

In a preferred embodiment, the litter may comprise about 0.10%, about 0.15%, about 0.20%, about 0.25%, about 0.30%, about 0.35%, about 0.40%, about 0.45%, about 0.50%, about 0.55%, about 0.60%, about 0.65%, about 0.70%, about 0.75%, about 0.80%, about 0.85%, about 0.90%, about 0.95%, about 1.00%, about 1.05%, about 1.10%, about 1.15%, about 1.20%, about 1.25%, about 1.30%, about 1.35%, about 1.40%, about 1.45%, about 1.50%, about 1.55%, about 1.60%, about 1.65%, about 1.70%, about 1.75%, about 1.80%, about 1.85%, about 1.90%, about 1.95%, about 2.00%, about 2.10%, about 2.15%, about 2.20%, about 2.25%, about 2.30%, about 2.35%, about 2.40%, about 2.45%, about 2.50%, about 2.55%, about 2.60%, about 2.65%, about 2.70%, about 2.75%, about 2.80%, about 2.85%, about 2.90%, about 2.95%, about 3.00%, about 3.05%, about 3.10%, about 3.15%, about 3.20%, about 3.25%, about 3.30%, about 3.35%, about 3.40%, about 3.45%, about 3.50%, about 3.55%, about 3.60%, about 3.65%, about 3.70%, about 3.75%, about 3.80%, about 3.85%, about 3.90%, about 3.95%, about 4.00%, about 4.10%, about 4.15%, about 4.20%, about 4.25%, about 4.30%, about 04.35%, about 4.40%, about 4.45%, about 4.50%, about 4.55%, about 4.60%, about 4.65%, about 4.70%, about 4.75%, about 4.80%, about 4.85%, about 4.90%, about 4.95% or about 5.00% w/w of xanthan gum.

In an advantageous embodiment, the xanthan gum may have varying viscosities and/or particle sizes, such as but not limited to, viscosities of 2000 cPs or 2390 cPs and/or average particle sizes of 46μ or 54μ.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

Example 1

The search for effective clumping agents has yielded a couple of alternatives to guar gum that have been shown to improve the clumping properties of scoopable cat litter. These are sodium carboxymethylcellulose (CMC) and xanthan gum, whose use is unexpected in cat litter formulations. Further, each has specific requirements to achieve an optimum clump strength (<2.0), for CMC a viscosity of ≥2000 cPs and average particle size of ≤188 microns and for xanthan gum a viscosity of ≥2000 cPs an average particle size of ≤54 microns.

Both CMC and xanthan gum were shown to be effective and stable when used with Blue Mountain, Ga. and Taft clays. Both additives were also effective in increasing the clump strength of a sodium bentonite/calcium bentonite blend.

First, a 500 g bath of 1% solution of each clumping additive in water was prepared using a high shear blender. The solutions were only blended for 10-15 seconds to prevent shearing of the polymer. Each solution was then transferred into a 16 ounce wide mouth jar and allowed to sit for 24 hours to de-aerate. After 24 hours, the viscosity of each solution was measured using a Brookfield viscometer with RV spindle #4 at 20 rpm. The reading was recorded after 30 seconds.

Following the viscosity measurements, a single batch of each experimental litter formula was prepared according to the formulation below:

| Ingredients | amt., g | % |
|---|---|---|
| 24/48 Blue Mountain RVM clay | 2000 | 99.01 |
| Clumping additive | 20 | 0.99 |
| Totals: | 2020 | 100.00 |

The required amount of clay and clumping additive were pre-weighed separately and then combined in a large cat litter pan. The mixture was blended by hand until uniform.

Next, each blend was transferred to a stainless steel bowl and three equally spaced indentations were made using a bottom of a small plastic vial.

A batch of synthetic urine was prepared in a blender according to the following formulations:

| Components: | % |
|---|---|
| Water | 92.43 |
| Urea | 5.22 |
| Ammonium phosphate dibasic | 0.70 |
| Sodium bisulfate | 0.45 |
| Ammonia | 0.33 |
| Potassium chloride | 0.32 |
| Sodium chloride | 0.27 |
| Creatinine | 0.18 |
| Magnessium chloride | 0.06 |
| Creatine | 0.03 |
| Calcium chloride | 0.02 |
| Total: | 100.00 |

Next, three clumps were made in a bowl releasing 20 ml of synthetic urine over each indentation using a transfer pipette. The first set of clumps were allowed to sit undisturbed for 30 seconds. After 30 seconds, the clumps were gently removed and placed one at a time on the platform of a dropping device positions parallel to the counter top. An aluminum sheet was placed below the dropping device (12 inches below the platform). The spring loaded platform was released causing the clump to free-fall into the aluminum sheet placed below. Each clump was evaluated visually for breakage and rated according to the scale below:

Clump intact: 1.0

Slight breakage: 2.0

Moderate to complete breakage: 3.0

The average of three rates was calculated and recorded. The test was later repeated for 1 hour, 24 hour, 48 hour and 72 hour clumps. The average clump strength of all time intervals was calculated and used for clump strength comparison between different clumping additives.

Next, the particle size of each clumping additive was determined using Malvem-laser diffraction particle size analyzer. Each sample was fed slowly into the sample chamber containing mixing isopropanol. When the obscuration value had reached 15%, the measurement was taken.

The formulation per plant Blue Mountain, Ga. and Taft (BL, GA and TF) were prepared using CMC #1 and xanthan gum #1. The batches were tested for clumping and then put on stability at 40° C. The stability samples were evaluated at 6 and 12 weeks.

In addition to evaluating the clump strength of non-swelling clay materials using CMC and xanthan gum, a couple of blends of sodium bentonite (swelling clay) and calcium bentonite (non-swelling clay) were prepared with and without each clumping additive according to the formulations that follow. All three formulae were later tested for clump strength using the method described above and a modified method in which clumps were dropped from the height of 47 inches using the existing clump dropping apparatus.

Sodium Bentonite/Calcium Bentonite Blend:

|  | % | g |
|---|---|---|
| Sodium bentonite | 64.36 | 1300 |
| Calcium bentonite | 34.65 | 700 |
| **Slurry #2 | 0.30 | 6 |
| ***Slurry #4 | 0.69 | 14 |
| Totals: | 100.00 | 2020 |

Sodium Bentonite/Calcium Bentonite Blend with CMC:

|  | % | g |
|---|---|---|
| Sodium bentonite | 64.20 | 1300 |
| Calcium bentonite | 34.57 | 700 |
| **Slurry #2 | 0.30 | 6 |
| ***Slurry #4 | 0.69 | 14 |
| CMC #1 | 0.25 | 5 |
| Totals: | 100.00 | 2025 |

Sodium Bentonite/Calcium Bentonite Blend with Xanthan Gum:

|  | % | g |
|---|---|---|
| Sodium bentonite | 64.20 | 1300 |
| Calcium bentonite | 34.57 | 700 |
| **Slurry #2 | 0.30 | 6 |
| ***Slurry #4 | 0.69 | 14 |
| Xanthan gum #1 | 0.25 | 5 |
| Totals: | 100.00 | 2025 |

Blue Mountain—CMC:

|  | % | g |
|---|---|---|
| Sand | 7.89 | 160 |
| BL RVM scoop size clay | 90.70 | 1840 |
| CMC #1 | 0.99 | 20 |
| *Slurry #1 | 0.43 | 8.7 |
| Totals: | 100.00 | 2028.7 |

Blue Mountain—Xanthan Gum:

|  | % | g |
|---|---|---|
| Sand | 7.89 | 160 |
| BL RVM scoop size clay | 90.70 | 1840 |
| Xanthan gum #1 | 0.99 | 20 |
| *Slurry #1 | 0.43 | 8.7 |
| Totals: | 100.00 | 2028.7 |

Georgia—CMC:

|  | % | g |
|---|---|---|
| Sand | 19.69 | 400 |
| GA RVM scoop size clay | 78.75 | 1600 |
| CMC #1 | 1.13 | 23 |
| *Slurry #1 | 0.43 | 8.7 |
| Totals: | 100.00 | 2031.7 |

Georgia—Xanthan Gum:

|  | % | g |
|---|---|---|
| Sand | 19.69 | 400 |
| GA RVM scoop size clay | 78.75 | 1600 |
| Xanthan gum #1 | 1.13 | 23 |
| *Slurry #1 | 0.43 | 8.7 |
| Totals: | 100.00 | 2031.7 |

Taft—CMC:

|  | % | g |
|---|---|---|
| Sand | 14.32 | 300 |
| TF RVM scoop size clay | 81.13 | 1700 |
| CMC #1 | 0.95 | 20 |
| Fragrance | 0.07 | 1.5 |
| Blue chips | 0.76 | 16 |
| ***Slurry #4 | 2.77 | 58 |
| Totals: | 100.00 | 2095.5 |

Taft—Xanthan Gum:

|  | % | g |
|---|---|---|
| Sand | 14.32 | 300 |
| TF RVM scoop size clay | 81.13 | 1700 |
| Xanthan gum #1 | 0.95 | 20 |
| Fragence | 0.07 | 1.5 |
| Blue chips | 0.76 | 16 |
| ***Slurry #4 | 2.77 | 58 |
| Totals: | 100.00 | 2095.5 |

The following slurry formulations were made:
*Slurry #1:

| Ingredient: | % | g |
|---|---|---|
| Water | 72.2 | 72.2 |
| Emulsifier | 10.0 | 10.0 |
| Fragence | 16.9 | 16.9 |
| Colorant | 0.9 | 0.9 |
| Totals: | 100.00 | 100.0 |

**Slurry #2:

| Ingredient: | % | g |
|---|---|---|
| Water | 68.8 | 72.2 |
| Emulsifier | 10.0 | 10.0 |
| Fragence | 16.9 | 16.9 |
| Colorant | 0.9 | 0.9 |
| Odor control additive | 3.4 | 3.4 |
| Totals: | 100.0 | 100.0 |

***Slurry #4:

| Ingredient: | % | 9 |
|---|---|---|
| Water | 98.0 | 98.0 |
| 60% PTFE suspension in water | 2.0 | 2.0 |
| Totals: | 100.0 | 100.0 |

The results for the clumping agents—viscosity, particle size and clump strength by additive type were as follows:

| Blue Mountain clay w/1% thickener, clump strength with synthetic urine, standard drop method | 30 sec. | 1 hr. | 24 hrs. | 48 hrs. | 72 hrs. | Average clump strength | Viscosity of 1% soln., cPs | Ave. particle size, micron | Material |
|---|---|---|---|---|---|---|---|---|---|
| CMC #1 (R-11-814) | 2.0 | 2.0 | 1.3 | 1.0 | 1.0 | 1.5 | 4450 | 49 | CMC |
| CMC #2 (R-12-180) | 1.7 | 1.7 | 1.0 | 1.7 | 2.0 | 1.6 | 4550 | 48 | CMC |
| CMC #3 (R-11-875) | 2.7 | 3.0 | 1.0 | 1.0 | 1.0 | 1.7 | 4100 | 77 | CMC |
| CMC #4 (R-11-543) | 3.0 | 2.7 | 1.0 | 1.3 | 2.3 | 2.1 | 3350 | 145 | CMC |
| CMC #5 (R-11-666) | 2.0 | 2.3 | 1.7 | 2.7 | 1.7 | 2.1 | 5550 | 84 | CMC |
| CMC #6 (R-11-813) | 2.3 | 2.7 | 2.0 | 1.7 | 2.0 | 2.1 | 6800 | 120 | CMC |
| CMC #7 (R-11-665) | 2.0 | 2.7 | 2.3 | 2.0 | 1.7 | 2.1 | 4250 | 97 | CMC |
| CMC #8 (R-11-476A) | 1.7 | 2.7 | 1.7 | 2.3 | 2.7 | 2.2 | 2200 | 223 | CMC |
| CMC #9 (R-11-527) | 3.0 | 3.0 | 1.3 | 2.3 | 1.7 | 2.3 | 1400 | 125 | CMC |
| CMC #10 (R-11-667) | 2.7 | 2.7 | 2.3 | 2.0 | 1.7 | 2.3 | 11700 | 88 | CMC |
| CMC #11 (R-11-709) | 1.7 | 2.3 | 2.7 | 3.0 | 2.3 | 2.4 | 2550 | 46 | CMC |
| CMC #12 (R-11-528) | 2.7 | 3.0 | 1.3 | 2.7 | 2.3 | 2.4 | 1150 | 139 | CMC |
| CMC #13 (R-11-654) | 2.0 | 2.7 | 2.7 | 3.0 | 3.0 | 2.7 | 1200 | 41 | CMC |
| CMC #14 (R-11-4768) | 3.0 | 3.0 | 2.7 | 3.0 | 2.7 | 2.9 | 3200 | 421 | CMC |

| Blue Mountain clay w/1% thickener, clump strength with synthetic urine, standard drop method | 30 sec. | 1 hr. | 24 hrs. | 48 hrs. | 72 hrs. | Average clump strength | Viscosity of 1% soln., cPs | Ave. particle size, micron | Material |
|---|---|---|---|---|---|---|---|---|---|
| Xanthan gum #1 (R-12-182) | 1.3 | 1.7 | 1.0 | 1.0 | 1.0 | 1.2 | 1750 | 46 | Xan |
| Xanthan gum #2 (R-12-184) | 2.7 | 2.7 | 1.7 | 1.7 | 1.3 | 2.0 | 3300 | 288 | Xan |
| Xanthan gum #3 (R-12-183) | 2.7 | 2.7 | 1.7 | 1.7 | 1.3 | 2.0 | 2800 | 131 | Xan |

| Blue Mountain clay w/1% thickener, clump strength with synthetic urine, standard drop method | 30 sec. | 1 hr. | 24 hrs. | 48 hrs. | 72 hrs. | Average clump strength | Viscosity of 1% soln., cPs | Ave. particle size, micron | Material |
|---|---|---|---|---|---|---|---|---|---|
| Guar gum #1 (R-11-874) | 2.3 | 2.7 | 2.7 | 2.7 | 2.7 | 2.6 | 6200 | 54 | Guar |
| Guar gum #2 (R-11-873) | 3.0 | 2.7 | 2.7 | 2.7 | 2.0 | 2.6 | 4350 | 141 | Guar |
| Guar gum #3 (R-11-475) | 3.0 | 3.0 | 2.3 | 2.3 | 3.0 | 2.7 | 5850 | 146 | Guar |

The results for the stability study—clump strength were as follows:

| Blue Mountain | 30 sec. | 1 hr. | 24 hrs. | 48 hrs. | 72 hrs. | Average clump strength |
|---|---|---|---|---|---|---|
| CMC #1 (R-11-814) initial | 2.0 | 2.0 | 1.3 | 1.0 | 1.0 | 1.5 |
| CMC #1 (R-11-814) 6 wks @40° C. | 2.0 | 2.3 | 1.3 | 1.0 | 1.0 | 1.5 |
| CMC #1 (R-11-814) 12 wks @40° C. | 3.0 | 2.3 | 1.3 | 1.0 | 1.0 | 1.7 |
| Xanthan gum #1 (R-12-182) | 1.3 | 1.7 | 1.0 | 1.0 | 1.0 | 1.2 |
| Xanthan gum #1 (R-12-182) 6 wks @40° C. | 2.0 | 2.7 | 1.0 | 1.0 | 1.0 | 1.5 |
| Xanthan gum #1 (R-12-182) 12 wks @40° C. | 2.0 | 3.0 | 1.0 | 1.0 | 1.0 | 1.6 |

| Georgia | 30 sec. | 1 hr. | 24 hrs. | 48 hrs. | 72 hrs. | Average clump strength |
|---|---|---|---|---|---|---|
| CMC #1 (R-11-814) initial | 2.3 | 2.3 | 1.3 | 1.0 | 1.0 | 1.6 |
| CMC #1 (R-11-814) 6 wks @40° C. | 1.7 | 2.3 | 1.0 | 1.0 | 1.0 | 1.4 |
| CMC #1 (R-11-814) 12 wks @40° C. | 1.3 | 1.0 | 1.0 | 1.0 | 1.0 | 1.1 |
| Xanthan gum #1 (R-12-182) | 1.0 | 1.0 | 1.0 | 1.0 | 1.0 | 1.0 |
| Xanthan gum #1 (R-12-182) 6 wks @40° C. | 1.0 | 1.7 | 1.0 | 1.0 | 1.0 | 1.1 |
| Xanthan gum #1 (R-12-182) 12 wks @40° C. | 1.3 | 1.0 | 1.0 | 1.0 | 1.0 | tbd |

| Taft | 30 sec. | 1 hr. | 24 hrs. | 48 hrs. | 72 hrs. | Average clump strength |
|---|---|---|---|---|---|---|
| CMC #1 (R-11-814) initial | 1.0 | 1.3 | 1.0 | 1.0 | 1.0 | 1.1 |
| CMC #1 (R-11-814) 6 wks @40° C. | 1.3 | 1.0 | 1.0 | 1.0 | 1.0 | 1.1 |
| CMC #1 (R-11-814) 12 wks @40° C. | 1.0 | 1.0 | 1.0 | 1.0 | 1.0 | 1.0 |
| Xanthan gum #1 (R-12-182) | 1.3 | 1.0 | 1.0 | 1.0 | 1.0 | 1.1 |

-continued

| Taft | 30 sec. | 1 hr. | 24 hrs. | 48 hrs. | 72 hrs. | Average clump strength |
|---|---|---|---|---|---|---|
| Xanthan gum #1 (R-12-182) 6 wks @40° C. | 1.0 | 1.0 | 1.0 | 1.0 | 1.0 | 1.0 |
| Xanthan gum #1 (R-12-182) 12 wks @40° C. | 1.0 | 1.0 | 1.0 | 1.0 | 1.0 | 1.0 |

The results for the sodium/calcium bentonite blend—clump strength were as follows:

| | Sodium bentonite/ calcium betonite blend | Sodium bentonite/ calcium betonite blend w/xanthan gum | Sodium bentonite/ calcium betonite blend w/CMC |
|---|---|---|---|
| Clump strength w/synthetic urine (std. method, 1-3**): | | | |
| 30 sec. | 1.0 | 1.0 | 1.0 |
| 1 hr. | 1.0 | 1.0 | 1.0 |
| 24 hrs. | 1.0 | 1.0 | 1.0 |
| 72 hrs. | 1.0 | 1.0 | 1.0 |
| Average: | 1.0 | 1.0 | 1.0 |
| Clump strength w/synthetic urine (drop method, 47", 1-3**): | | | |
| 30 sec. | 3.0 | 1.0 | 1.0 |
| 1 hr. | 1.7 | 1.0 | 1.0 |
| 24 hrs. | 1.7 | 1.0 | 1.0 |
| 72 hrs. | 1.7 | 1.0 | 1.0 |
| Average: | 2.0 | 1.0 | 1.0 |

The conclusions were as follows:
1. CMC with an average particle size of ≤77 microns and viscosity of ≥4100 cPs and xanthan gum with average particle size of ≤46 microns are optimum clumping additives for scooping cat litter based on a non-sodium bentonite clay.
2. Both CMC and xanthan gum with properties listed above produce much stronger clumps than guar.
3. Both CMC and xanthan gum are stable and effective in cat litter formulations prepared with Blue Mountain, Ga. and Taft clays.
4. CMC and xanthan gum improve clumping properties of sodium bentonite/calcium bentonite blends.

Example 2

CMC (visc.: 4100 cPs and ave. p.s.: 77μ) and Xanthan Gum (visc.: 1750 cPs and ave. p.s.: 46μ) were used as replacements for Guar Gum (visc.: 6200 cPs and ave. p.s.: 54μ). In addition to significant cost savings, the new additives delivered improved clumping and lower dust.

Sixty eight different clumping additives including the standards were tested side by side for clump strength, particle size and viscosity. After the initial round of testing, 11 best performing additives were placed on accelerated stability study. Based on the results of the study, four CMC formulations were found to be good candidates to improve the CMC (visc.: 4100 cPs and ave. p.s.: 77μ) and Xanthan Gum (visc.: 1750 cPs and ave. p.s.: 46μ) guar replacements in Clumping formula #1, Clumping formula #2 and Clumping formula #3 out of Blue Mountain, Miss.

Xanthan Gum (visc.: 2000 cPs, ave. p.s.: 54μ (R-12-730)
CMC (visc.: 5750 cPs, ave. p.s.: 188 (R-12-1182)
CMC (visc.: 2000 cPs and ave. p.s.: 55μ) (R-12-1173)
CMC (visc.: 5710 cPs and ave. p.s.: 65μ) (R-12-857)

The clump strength ranking for new and previously approved additives is as follows:

1. Xanthan Gum (visc.: 2930 cPs and ave. p.s.: 46μ) (R-12-475)
2. Xanthan Gum (visc.: 2000 cPs, ave. p.s.: 54μ (R-12-730)
3. CMC (visc.: 4450 cPs and ave. p.s. 49μ) (R-11-814)
4. CMC (visc.: 5750 cPs and ave. p.s.: 188μ (R-12-1182)
5. CMC (visc. 5710 cPs and ave p.s.; 65μ) (R-12-857)

Xanthan Gum (visc.: 2930 cPs and ave. p.s.: 46μ) was found to provide by far the highest clump strength out of all additives tested.

The experimental procedures were as follows. First, a 500 g batch of 1% solution of each clumping additive in water was prepared in a high shear blender. Each solution was mixed for 30 seconds and then transferred to a 16-oz wide mouth jar and allowed to de-aerate overnight. After 24 hours, a viscosity reading was taken using a Brookfield viscometer with spindle #4 at 20 rpm. The measurement was taken at 30 seconds.

Next, a particle size of each additive was determined by laser diffraction using a Malvern Mastersizer.

Following the particle size analysis, a 2000 g batch of Clumping formula #1 was prepared with each of the additives following the formulation below:

Clumping Formula #1:

| Components: | % | Amt., g |
|---|---|---|
| BL scoop clay (de-dusted) | 99.00 | 1980.0 |
| Clumping additive | 1.00 | 20.0 |
| Total: | 100.00 | 2000.0 |

For simplification reasons, no liquid additives were used.

Next, clumping properties of each batch were evaluated at 30 seconds, 1 hour, 24, 48 & 72 hours using synthetic urine and a drop test. According with the test procedure, clumps were prepared in triplicate with 20 ml of synthetic urine. At a specified time interval, each clump was removed from a litter and placed on a platform of a dropping device. The clump was then dropped from a height of 12 inches. The degree of breakage in the clump was rated on a scale from 1 to 3, 1 being "clump intact", 2-"slight breakage" and 3-"moderate breakage".

The average clump strength of all time intervals was later calculated for each material. Next, all batches with an average clump strength of 1.5 or less were re-tested using an extreme clump test method where the clumps were dropped from a height of 47 inches. All batched with average clump strength of 2.0 or less were put on accelerated stability study run for 12 weeks at 40° C.

At 6 and 12 weeks, the samples were removed from the stability chamber and allowed to sit for 24 hours to equilibrate to room temperature conditions. After 24 hours the samples were tested following the regular and extreme clump strength procedures Next, batches of Clumping formula #2 and Clumping formula #3 were prepared using each of the selected additives following the formulations below:

Clumping Formula #2:

| Components: | % | Amt., g |
|---|---|---|
| Sodium bentonite | 64.39 | 1300 |
| 10/24 BL RVM | 34.67 | 700 |
| Slurry #4 | 0.69 | 14 |
| Clumping additive | 0.25 | 5 |
| Total: | 100.00 | 2019.0 |

Clumping Formula #3:

| Components: | % | Amt., g |
|---|---|---|
| BM-RVM clay | 94.43 | 2000 |
| Odor control/dust control additives | 4.15 | 88 |
|  | 1.42 | 30 |
| Total: | 100.00 | 2118.0 |

Both formulas were subjected to regular and extreme clump and dust testing.

The final determination of acceptable additives was derived by calculating the average clump strength of the initial and stability clump results for both regular and extreme methods.

Results for initial clump strength (regular method), viscosity & particle size were as follows:

| Clumping formula #1 w/1% thickener, clump strength with | 30 | 1 | 24 | 48 | 72 | Average | Viscosity | Ave. | Median |
|---|---|---|---|---|---|---|---|---|---|
| Guar (R-12-1109) | 1.0 | 1.0 | 1.0 | 1.0 | 1.0 | 1.0 | 6200 | 48 | 43 |
| Guar (R-12-1110) | 1.0 | 1.0 | 1.0 | 1.0 | 1.0 | 1.0 | 6450 | 49 | 43 |
| CMC (R-12-1173) | 1.0 | 1.0 | 1.0 | 1.0 | 1.0 | 1.0 | 2000 | 55 | 44 |
| CMC (R-12-1182) | 1.0 | 1.0 | 1.0 | 1.0 | 1.0 | 1.0 | 5750 | 188 | 131 |
| CMC (R-12-871) | 1.0 | 1.0 | 1.0 | 1.0 | 1.0 | 1.0 | 4450 | 88 | 68 |
| Guar (R-13-003) | 1.0 | 1.0 | 1.0 | 1.0 | 1.0 | 1.0 | 3780 | 56 | 51 |
| Guar(R-10-940) | 1.0 | 1.0 | 1.0 | 1.0 | 1.0 | 1.0 | 6160 | 58 | 54 |
| Guar treated for dust (R-10-938) | 1.0 | 1.0 | 1.0 | 1.0 | 1.0 | 1.0 | 8090 | 47 | 44 |
| CMC (R-12-870) | 1.3 | 1.0 | 1.0 | 1.0 | 1.0 | 1.1 | 2200 | 84 | 65 |
| Xanthan Gum (R-12-475) | 1.7 | 1.0 | 1.0 | 1.0 | 1.0 | 1.1 | 2930 | 53 | 40 |
| Xanthan Gum (R-12-182) | 1.3 | 1.7 | 1.0 | 1.0 | 1.0 | 1.2 | 1750 | 46 | 40 |
| Guar (R-10-939) | 2.0 | 1.0 | 1.0 | 1.0 | 1.0 | 1.2 | 5150 | 100 | 74 |
| CMC (R-12-736) | 1.7 | 2.0 | 1.0 | 1.0 | 1.0 | 1.3 | 6470 | 70 | 59 |
| CMC (R-12-857) | 1.0 | 2.3 | 1.0 | 1.7 | 1.0 | 1.4 | 5710 | 65 | 55 |
| CMC (R-11-814) | 2.0 | 2.0 | 1.3 | 1.0 | 1.0 | 1.5 | 4450 | 49 | 43 |
| Xanthan Gum (R-12-730) | 1.7 | 2.7 | 1.0 | 1.0 | 1.0 | 1.5 | 2000 | 54 | 44 |
| CMC (R-12-1172) | 3.0 | 1.7 | 1.0 | 1.0 | 1.0 | 1.5 | 1900 | 385 | 375 |
| Xanthan Gum treated for dust (R-12-476) | 2.0 | 3.0 | 1.0 | 1.0 | 1.0 | 1.6 | 3720 | N/A | N/A |
| CMC (R-12-180) | 1.7 | 1.7 | 1.0 | 1.7 | 2.0 | 1.6 | 4550 | 48 | 42 |
| CMC (R-12-735) | 2.7 | 1.7 | 1.0 | 1.3 | 1.7 | 1.7 | 6410 | 98 | 74 |
| Guar/Starch (R-12-264) | 3.0 | 2.7 | 1.0 | 1.0 | 1.0 | 1.7 | 100 | 114 | 100 |
| CMC (R-11-875) | 2.7 | 3.0 | 1.0 | 1.0 | 1.0 | 1.7 | 4100 | 77 | 55 |
| Tara Gum (R-12-157) | 2.0 | 2.0 | 1.3 | 1.7 | 1.7 | 1.7 | 4000 | 92 | 80 |
| Guar/Starch (R-12-263) | 3.0 | 3.0 | 1.0 | 1.0 | 1.0 | 1.8 | 80 | 122 | 110 |
| Guar/Starch (R-12-265) | 3.0 | 3.0 | 1.0 | 1.0 | 1.0 | 1.8 | 570 | 100 | 84 |
| Xanthan Gum treated for dust (R-12-477) | 3.0 | 3.0 | 1.3 | 1.0 | 1.0 | 1.9 | 3150 | N/A | N/A |
| Xanthan Gum (R-12-886) | 3.0 | 3.0 | 1.0 | 1.7 | 1.0 | 1.9 | 3450 | 95 | 77 |
| CMC (R-12-734) | 3.0 | 3.0 | 1.7 | 1.0 | 1.0 | 1.9 | 2200 | 80 | 57 |
| Unknown (R-12-328) | 3.0 | 1.7 | 1.0 | 2.0 | 2.3 | 2.0 | 2830 | 119 | 90 |
| Xanthan Gum (R-12-184) | 2.7 | 2.7 | 1.7 | 1.7 | 1.3 | 2.0 | 3300 | 288 | 275 |
| Xanthan Gum (R-12-183) | 2.7 | 2.7 | 1.7 | 1.7 | 1.3 | 2.0 | 2800 | 131 | 118 |
| Psyllium (R-11-799) | 3.0 | 2.3 | 2.0 | 1.7 | 1.3 | 2.1 | 560 | 101 | 100 |
| CMC (R-11-543) | 3.0 | 2.7 | 1.0 | 1.3 | 2.3 | 2.1 | 3350 | 145 | 113 |
| Unknown (R-12-327) | 3.0 | 3.0 | 1.3 | 1.7 | 1.3 | 2.1 | 1200 | 199 | 176 |
| CMC (R-11-666) | 2.0 | 2.3 | 1.7 | 2.7 | 1.7 | 2.1 | 5550 | 84 | 64 |
| CMC (R-11-813) | 2.3 | 2.7 | 2.0 | 1.7 | 2.0 | 2.1 | 6800 | 120 | 67 |
| CMC (R-11-665) | 2.0 | 2.7 | 2.3 | 2.0 | 1.7 | 2.1 | 4250 | 97 | 75 |
| Unknown (R-12-181) | 3.0 | 2.3 | 1.7 | 1.7 | 2.0 | 2.1 | 4200 | 151 | 135 |
| HPMC (R-13-002) | 1.0 | 1.7 | 2.7 | 3.0 | 2.3 | 2.1 | 1910 | 103 | 69 |
| CMC (R-11-476A) | 1.7 | 2.7 | 1.7 | 2.3 | 2.7 | 2.2 | 2200 | 223 | 177 |
| CMC (R-11-527) | 3.0 | 3.0 | 1.3 | 2.3 | 1.7 | 2.3 | 1400 | 125 | 82 |
| CMC (R-11-667) | 2.7 | 2.7 | 2.3 | 2.0 | 1.7 | 2.3 | 11700 | 88 | 68 |
| CMC (R-11-709) | 1.7 | 2.3 | 2.7 | 3.0 | 2.3 | 2.4 | 2550 | 46 | 38 |
| CMC (R-11-528) | 2.7 | 3.0 | 1.3 | 2.7 | 2.3 | 2.4 | 1150 | 139 | 97 |
| Unknown (R-12-330) | 3.0 | 3.0 | 2.3 | 2.0 | 1.7 | 2.4 | 5410 | 105 | 76 |
| HEMC (R-12-302) | 3.0 | 3.0 | 2.3 | 2.3 | 1.7 | 2.5 | 40 | 171 | 123 |
| Unknown (R-12-329) | 3.0 | 3.0 | 2.0 | 2.3 | 2.3 | 2.5 | 3440 | 95 | 67 |
| HPMC (R-12-303) | 3.0 | 3.0 | 2.0 | 2.0 | 2.7 | 2.5 | 220 | 190 | 150 |
| Guar (R-11-874) | 2.3 | 2.7 | 2.7 | 2.7 | 2.7 | 2.6 | 6200 | 54 | 49 |
| Guar (R-11-873) | 3.0 | 2.7 | 2.7 | 2.7 | 2.0 | 2.6 | 4350 | 141 | 132 |
| CMC (R-11-654) | 2.0 | 2.7 | 2.7 | 3.0 | 3.0 | 2.7 | 1200 | 41 | 34 |
| Guar (R-11-475) | 3.0 | 3.0 | 2.3 | 2.3 | 3.0 | 2.7 | 5850 | 146 | 142 |
| Psyllium (R-11-560) | 3.0 | 3.0 | 2.3 | 3.0 | 2.3 | 2.7 | 40 | 404 | 395 |
| Unknown (R-11-885) | 3.0 | 3.0 | 3.0 | 2.3 | 2.3 | 2.7 | 600 | 173 | 138 |
| Guar standard (R-10-653) | 2.3 | 3.0 | 2.7 | 3.0 | 3.0 | 2.8 | 4750 | 4750 | 42 |
| Unknown (R-11-886) | 3.0 | 3.0 | 2.7 | 2.7 | 2.7 | 2.8 | 1750 | 170 | 151 |
| Pectin (R-12-158) | 3.0 | 3.0 | 3.0 | 3.0 | 2.3 | 2.9 | 500 | 215 | 196 |

| Clumping formula #1 w/1% thickener, clump strength with | 30 | 1 | 24 | 48 | 72 | Average | Viscosity | Ave. | Median |
|---|---|---|---|---|---|---|---|---|---|
| CMC (R-11-476B) | 3.0 | 3.0 | 2.7 | 3.0 | 2.7 | 2.9 | 3200 | 421 | 419 |
| Psyllium (R-11-876) | 3.0 | 3.0 | 2.7 | 2.7 | 3.0 | 2.9 | 15 | 219 | 168 |
| Pre0gealtinized corn flour (R-10-672) | 3.0 | 3.0 | 3.0 | 3.0 | 2.7 | 2.9 | 15 | 115 | 104 |
| Unknown (R-12-325) | 3.0 | 3.0 | 3.0 | 3.0 | 2.7 | 2.9 | 390 | 79 | 60 |
| Unknown (R-12-326) | 3.0 | 3.0 | 3.0 | 3.0 | 2.7 | 2.9 | 840 | 211 | 194 |
| Psyllium (R-12-282) | 3.0 | 3.0 | 3.0 | 3.0 | 3.0 | 3.0 | 70 | 173 | 105 |
| Unknown (R-12-283) | 3.0 | 3.0 | 3.0 | 3.0 | 3.0 | 3.0 | 590 | 156 | 131 |
| Sugar beet pulp (R-12-635) | 3.0 | 3.0 | 3.0 | 3.0 | 3.0 | 3.0 | N/A | N/A | N/A |
| Sugar beet pulp(R-12-636) | 3.0 | 3.0 | 3.0 | 3.0 | 3.0 | 3.0 | N/A | N/A | N/A |
| Carragenan Gum (R-11-402) | 3.0 | 3.0 | 3.0 | 3.0 | 3.0 | 3.0 | 1340 | 67 | 52 |
| Arabic Gum (R-08-046) | 3.0 | 3.0 | 3.0 | 3.0 | 3.0 | 3.0 | N/A | 57 | 52 |

Results for initial clump strength for additives with average clump strength of 1.5 or less (extreme method), viscosity & particle size were as follows:

| Clumping formula #1 w/1% thickener, extreme clump strength with synthetic urine, extreme drop method | 30 sec. | 1 hr. | 24 hrs. | 48 hrs. | 72 hrs. | Average clump strength |
|---|---|---|---|---|---|---|
| Guar (R-12-1109) | 1.0 | 1.0 | 1.3 | 2.0 | 1.3 | 1.3 |
| Guar (R-12-1110) | 1.0 | 1.0 | 1.3 | 2.0 | 1.3 | 1.3 |
| Guar (R-13-003) | 1.3 | 1.3 | 1.7 | 1.0 | 1.3 | 1.3 |
| Guar (R-10-938) | 1.0 | 1.0 | 1.7 | 2.0 | 1.3 | 1.4 |
| CMC (R-11-814) | 1.3 | 3.0 | 1.3 | 1.0 | 1.3 | 1.6 |
| CMC (R-12-1182) | 2.0 | 2.7 | 1.0 | 1.0 | 1.3 | 1.6 |
| CMC (R-12-857) | 1.3 | 1.0 | 1.7 | 2.3 | 2.0 | 1.7 |
| Xanthan Gum (R-12-730) | 2.3 | 2.7 | 1.3 | 1.3 | 1.0 | 1.7 |
| Guar (R-10-940) | 2.0 | 1.7 | 2.0 | 2.0 | 1.3 | 1.8 |
| Xanthan Gum (R-12-475) | 2.7 | 2.3 | 1.0 | 2.0 | 1.3 | 1.9 |
| CMC (R-12-1173) | 1.0 | 2.0 | 1.3 | 3.0 | 2.7 | 2.0 |
| CMC (R-12-870) | 1.3 | 2.3 | 2.7 | 2.3 | 1.7 | 2.1 |
| CMC (R-12-871) | 2.3 | 2.7 | 2.7 | 2.3 | 1.7 | 2.3 |
| CMC (R-12-736) | 3.0 | 1.3 | 3.0 | 3.0 | 1.7 | 2.4 |
| CMC (R-12-1172) | 3.0 | 3.0 | 3.0 | 3.0 | 1.7 | 2.7 |
| Guar (R-10-939) | 3.0 | 3.0 | 3.0 | 2.3 | 3.0 | 2.9 |

Clumping Formula #1 Stability:

Initial results Clumping formula #1

| Clumping formula #1 w/1% thickener, REGULAR clump strength with synthetic urine | 30 sec. | 1 hr. | 24 hrs. | 48 hrs. | 72 hrs. | Average clump strength |
|---|---|---|---|---|---|---|
| CMC (R-12-857) | 1.0 | 1.0 | 1.0 | 1.0 | 1.0 | 1.0 |
| CMC (R-12-1173) | 1.0 | 1.0 | 1.0 | 1.0 | 1.0 | 1.0 |
| Guar (R-10-940) | 1.0 | 1.0 | 1.3 | 1.0 | 1.0 | 1.1 |
| Guar (R-10-938) | 1.0 | 1.0 | 2.0 | 1.0 | 1.0 | 1.2 |
| CMC (R-12-1182) | 1.0 | 1.0 | 1.0 | 1.0 | 1.0 | 1.0 |
| CMC (R-11-814) | 1.0 | 1.0 | 1.0 | 1.0 | 1.0 | 1.0 |
| Guar (R-12-1109) | 1.0 | 1.0 | 1.3 | 1.0 | 1.3 | 1.1 |
| Guar (R-12-1110) | 1.0 | 1.0 | 1.7 | 1.7 | 1.7 | 1.4 |
| Guar (R-13-003) | 1.0 | 1.0 | 1.0 | 1.0 | 1.0 | 1.0 |
| Xanthan Gum (R-12-730) | 1.0 | 1.0 | 1.0 | 1.0 | 1.0 | 1.0 |
| Xanthan Gum (R-12-475) | 1.0 | 1.0 | 1.0 | 1.0 | 1.0 | 1.0 |

| Clumping formula #1 w/1% thickener, EXTREME clump strength with synthetic urine | 30 sec. | 1 hr. | 24 hrs. | 48 hrs. | 72 hrs. | Average clump strength |
|---|---|---|---|---|---|---|
| CMC (R-12-857) | 1.7 | 1.3 | 1.0 | 1.0 | 1.0 | 1.2 |
| CMC (R-12-1173) | 1.0 | 1.7 | 2.0 | 1.0 | 1.3 | 1.4 |
| Guar (R-10-940) | 1.7 | 2.7 | 3.0 | 2.7 | 3.0 | 2.6 |
| Guar (R-10-938) | 1.0 | 2.3 | 2.0 | 3.0 | 3.0 | 2.3 |
| CMC (R-12-1182) | 1.7 | 2.0 | 1.7 | 1.0 | 1.7 | 1.6 |
| CMC (R-11-814) | 1.0 | 1.7 | 2.0 | 2.0 | 1.0 | 1.5 |
| Guar (R-12-1109) | 1.3 | 2.3 | 2.7 | 3.0 | 2.7 | 2.4 |
| Guar (R-12-1110) | 1.0 | 2.7 | 2.7 | 3.0 | 3.0 | 2.5 |
| Guar (R-13-003) | 1.0 | 1.0 | 2.0 | 2.3 | 1.7 | 1.6 |
| Xanthan Gum (R-12-730) | 1.0 | 1.3 | 2.3 | 1.0 | 1.0 | 1.3 |
| Xanthan Gum (R-12-475) | 1.0 | 1.0 | 1.7 | 1.0 | 1.0 | 1.1 |

6 wks @40° C. Clumping formula #1

| Clumping formula #1 w/1% clumping additive, REGULAR clump strength with synthetic urine | 30 sec. | 1 hr. | 24 hrs. | 48 hrs. | 72 hrs. | Average clump strength |
|---|---|---|---|---|---|---|
| CMC (R-12-857) | 1.7 | 3.0 | 1.3 | 2.3 | 2.3 | 2.1 |
| CMC (R-12-1173) | 1.3 | 1.0 | 1.0 | 1.3 | 1.0 | 1.3 |
| Guar (R-10-940) | 2.3 | 1.3 | 1.0 | 1.3 | 1.0 | 1.4 |
| Guar (R-10-938) | 2.0 | 1.7 | 2.0 | 1.7 | 3.0 | 2.1 |
| CMC (R-12-1182) | 2.7 | 2.7 | 1.0 | 1.7 | 1.0 | 1.8 |
| CMC (R-11-814) | 2.0 | 2.7 | 2.0 | 1.0 | 1.4 | 1.8 |
| Guar (R-12-1109) | 1.3 | 2.0 | 1.0 | 1.0 | 1.3 | 1.3 |
| Guar (R-12-1110) | 1.0 | 2.3 | 1.3 | 1.3 | 2.0 | 1.6 |
| Guar (R-13-003) | 3.0 | 1.7 | 1.3 | 2.3 | 2.7 | 2.2 |
| Xanthan Gum (R-12-730) | 3.0 | 3.0 | 1.3 | 1.0 | 1.0 | 1.9 |
| Xanthan Gum (R-12-475) | 1.0 | 1.0 | 1.3 | 1.0 | 1.0 | 1.1 |

| Clumping formula #1 w/1% clumping additive, EXTREME clump strength with synthetic urine | 30 sec. | 1 hr. | 24 hrs. | 48 hrs. | 72 hrs. | Average clump strength |
|---|---|---|---|---|---|---|
| CMC (R-12-857) | 3.0 | 2.0 | 2.3 | 3.0 | 1.7 | 2.4 |
| CMC (R-12-1173) | 2.3 | 2.7 | 3.0 | 3.0 | 1.7 | 2.5 |
| Guar (R-10-940) | 3.0 | 2.3 | 2.0 | 2.3 | 1.0 | 2.1 |
| Guar (R-10-938) | 2.3 | 3.0 | 3.0 | 3.0 | 1.0 | 2.5 |
| CMC (R-12-1182) | 3.0 | 2.7 | 2.0 | 2.0 | 1.3 | 2.1 |
| CMC (R-11-814) | 3.0 | 3.0 | 1.7 | 2.3 | 1.0 | 2.2 |
| Guar (R-12-1109) | 2.7 | 3.0 | 3.0 | 3.0 | 1.0 | 2.5 |
| Guar (R-12-1110) | 3.0 | 2.3 | 3.0 | 3.0 | 1.0 | 2.5 |
| Guar (R-13-003) | 2.3 | 2.0 | 2.7 | 3.0 | 1.3 | 2.3 |
| Xanthan Gum (R-12-730) | 3.0 | 3.0 | 1.0 | 2.0 | 1.0 | 2.0 |
| Xanthan Gum (R-12-475) | 2.7 | 2.3 | 1.0 | 1.0 | 1.0 | 1.6 |

12 wks @40° C. CPS

| Clumping formula #1 w/1% clumping additive, REGULAR clump strength with synthetic urine | 30 sec. | 1 hr. | 24 hrs. | 48 hrs. | 72 hrs. | Average clump strength |
|---|---|---|---|---|---|---|
| CMC (R-12-857) | 3.0 | 1.0 | 3.0 | 1.0 | 1.0 | 1.8 |
| CMC (R-12-1173) | 3.0 | 3.0 | 1.3 | 1.0 | 1.0 | 1.9 |
| Guar (R-10-940) | 1.7 | 2.7 | 1.3 | 1.0 | 1.7 | 1.7 |
| Guar (R-10-938) | 2.0 | 1.0 | 1.3 | 1.0 | 1.0 | 1.3 |
| CMC (R-12-1182) | 3.0 | 1.7 | 1.7 | 1.0 | 1.0 | 1.7 |
| CMC (R-11-814) | 2.3 | 2.7 | 1.0 | 1.0 | 1.0 | 1.6 |
| Guar (R-12-1109) | 1.0 | 2.7 | 2.7 | 1.7 | 2.0 | 2.0 |
| Guar (R-12-1110) | 1.7 | 2.3 | 2.7 | 2.3 | 1.3 | 2.1 |
| Guar (R-13-003) | 2.0 | 1.0 | 2.0 | 2.0 | 1.7 | 1.7 |
| Xanthan Gum (R-12-730) | 1.7 | 2.0 | 3.0 | 1.0 | 1.7 | 1.7 |
| Xanthan Gum (R-12-475) | 1.0 | 1.0 | 1.0 | 1.0 | 1.0 | 1.0 |

| Clumping formula #1 w/1% clumping additive, EXTREME clump strength with synthetic urine | 30 sec. | 1 hr. | 24 hrs. | 48 hrs. | 72 hrs. | Average clump strength |
|---|---|---|---|---|---|---|
| CMC (R-12-857) | 2.7 | 2.0 | 2.3 | 3.0 | 2.7 | 2.5 |
| CMC (R-12-1173) | 3.0 | 3.0 | 1.7 | 2.7 | 3.0 | 2.7 |
| Guar (R-10-940) | 2.7 | 1.7 | 2.7 | 2.7 | 2.3 | 2.4 |
| Guar (R-10-938) | 1.7 | 1.0 | 2.3 | 3.0 | 3.0 | 2.2 |
| CMC (R-12-1182) | 3.0 | 3.0 | 2.3 | 2.0 | 2.0 | 2.5 |
| CMC (R-11-814) | 1.7 | 3.0 | 1.7 | 3.0 | 1.7 | 2.2 |
| Guar (R-12-1109) | 1.7 | 3.0 | 3.0 | 3.0 | 3.0 | 2.7 |
| Guar (R-12-1110) | 1.3 | 3.0 | 3.0 | 3.0 | 3.0 | 2.7 |
| Guar (R-13-003) | 3.0 | 3.0 | 3.0 | 2.7 | 3.0 | 2.9 |
| Xanthan Gum (R-12-730) | 3.0 | 2.7 | 1.7 | 1.3 | 3.0 | 2.3 |
| Xanthan Gum (R-12-475) | 2.3 | 1.0 | 1.0 | 1.3 | 3.0 | 1.7 |

Initial Clump Strength—Clumping Formula #3:
Initial results Clumping formula #3

| Clumping formula #3 w/1.5% thickener, REGULAR clump strength with New SU | 30 sec. | 1 hr. | 24 hrs. | 48 hrs. | 72 hrs. | Average clump strength |
|---|---|---|---|---|---|---|
| CMC (R-12-857) | 1.0 | 1.0 | 1.0 | 1.0 | 1.0 | 1.0 |
| CMC (R-12-1173) | 1.0 | 1.0 | 1.0 | 1.0 | 1.0 | 1.0 |
| Guar (R-10-940) | 1.0 | 1.0 | 1.0 | 1.0 | 1.0 | 1.0 |
| Guar (R-10-938) | 1.0 | 1.0 | 1.0 | 1.0 | 1.0 | 1.0 |
| CMC (R-12-1182) | 1.0 | 1.0 | 1.0 | 1.0 | 1.0 | 1.0 |
| CMC (R-11-814) | 1.0 | 1.0 | 1.0 | 1.0 | 1.0 | 1.0 |
| Guar (R-12-1109) | 1.0 | 1.0 | 1.0 | 1.0 | 1.0 | 1.0 |
| Guar (R-12-1110) | 1.0 | 1.0 | 1.0 | 1.0 | 1.0 | 1.0 |
| Guar (R-13-003) | 1.0 | 1.0 | 1.0 | 1.0 | 1.0 | 1.0 |
| Xanthan Gum (R-12-730) | 1.0 | 1.0 | 1.0 | 1.0 | 1.0 | 1.0 |
| Xanthan Gum (R-12-475) | 1.0 | 1.0 | 1.0 | 1.0 | 1.0 | 1.0 |

| Clumping formula #3 w/1.5% thickener, EXTREME clump strength with New SU | 30 sec. | 1 hr. | 24 hrs. | 48 hrs. | 72 hrs. | Average clump strength |
|---|---|---|---|---|---|---|
| CMC (R-12-857) | 1.0 | 1.0 | 1.3 | 1.0 | 1.0 | 1.1 |
| CMC (R-12-1173) | 1.3 | 1.0 | 1.0 | 1.0 | 1.0 | 1.1 |
| Guar (R-10-940) | 1.3 | 2.3 | 3.0 | 3.0 | 3.0 | 2.5 |
| Guar (R-10-938) | 1.0 | 2.0 | 3.0 | 3.0 | 3.0 | 2.4 |
| CMC (R-12-1182) | 1.3 | 1.7 | 1.0 | 1.0 | 1.0 | 1.2 |
| CMC (R-11-814) | 1.0 | 1.3 | 1.0 | 1.0 | 1.0 | 1.1 |
| Guar (R-12-1109) | 1.0 | 2.0 | 3.0 | 3.0 | 3.0 | 2.4 |
| Guar (R-12-1110) | 1.0 | 1.7 | 3.0 | 3.0 | 3.0 | 2.3 |
| Guar (R-13-003) | 1.3 | 1.0 | 1.0 | 1.0 | 1.0 | 1.1 |
| Xanthan Gum (R-12-730) | 2.0 | 1.0 | 2.7 | 1.0 | 1.0 | 1.5 |
| Xanthan Gum (R-12-475) | 1.0 | 1.0 | 1.0 | 1.0 | 1.0 | 1.0 |

Initial Clump Strength—Clumping Formula #2
Initial results Clumping formula #2

| Clumping formula #2 w/0.25 clumping additive, REGULAR clump strength with New SU | 30 sec. | 1 hr. | 24 hrs. | 48 hrs. | 72 hrs. | Average clump strength |
|---|---|---|---|---|---|---|
| CMC (R-12-857) | 1.0 | 1.0 | 1.0 | 1.0 | 1.0 | 1.0 |
| CMC (R-12-1173) | 1.0 | 1.0 | 1.0 | 1.0 | 1.0 | 1.0 |
| Guar (R-10-940) | 1.0 | 1.0 | 1.0 | 1.0 | 1.0 | 1.0 |
| Guar (R-10-938) | 1.0 | 1.0 | 1.0 | 1.0 | 1.0 | 1.0 |
| CMC (R-12-1182) | 1.0 | 1.0 | 1.0 | 1.0 | 1.0 | 1.0 |
| CMC (R-11-814) | 1.0 | 1.0 | 1.0 | 1.0 | 1.0 | 1.0 |
| Guar (R-12-1109) | 1.0 | 1.0 | 1.0 | 1.0 | 1.0 | 1.0 |
| Guar (R-12-1110) | 1.0 | 1.0 | 1.0 | 1.0 | 1.0 | 1.0 |
| Guar (R-13-003) | 1.0 | 1.0 | 1.0 | 1.0 | 1.0 | 1.0 |
| Xanthan Gum (R-12-730) | 1.0 | 1.0 | 1.0 | 1.0 | 1.0 | 1.0 |
| Xanthan Gum (R-12-475) | 1.0 | 1.0 | 1.0 | 1.0 | 1.0 | 1.0 |

| Clumping formula #2 w/0.25 clumping additive, EXTREME clump strength with New SU | 30 sec. | 1 hr. | 24 hrs. | 48 hrs. | 72 hrs. | Average clump strength |
|---|---|---|---|---|---|---|
| CMC (R-12-857) | 1.7 | 1.0 | 1.0 | 1.0 | 1.0 | 1.1 |
| CMC (R-12-1173) | 1.0 | 1.0 | 1.0 | 1.0 | 1.0 | 1.0 |
| Guar (R-10-940) | 1.0 | 1.7 | 1.0 | 1.3 | 1.0 | 1.2 |
| Guar (R-10-938) | 1.0 | 1.0 | 1.0 | 1.0 | 1.0 | 1.0 |
| CMC (R-12-1182) | 1.0 | 1.0 | 1.0 | 1.3 | 1.0 | 1.1 |
| CMC (R-11-814) | 1.0 | 1.0 | 1.0 | 1.0 | 1.0 | 1.0 |
| Guar (R-12-1109) | 1.0 | 1.0 | 1.0 | 1.7 | 1.0 | 1.1 |
| Guar (R-12-1110) | 1.0 | 1.3 | 1.0 | 1.3 | 1.0 | 1.1 |
| Guar (R-13-003) | 1.3 | 1.0 | 1.0 | 1.0 | 2.0 | 1.3 |
| Xanthan Gum (R-12-730) | 1.3 | 1.3 | 1.0 | 1.0 | 1.0 | 1.1 |
| Xanthan Gum (R-12-475) | 1.0 | 1.0 | 1.0 | 1.0 | 1.0 | 1.0 |

Results Summary:

| Clumping formula #1 with 1% clumping additive | initial reg. | 6 wks @40° C., reg. | 12 wks @40° C., reg. | initial ext. | 6 wks @40° C., ext. | 12 wks @40° C., ext. | AVERAGE |
|---|---|---|---|---|---|---|---|
| Xanthan Gum (R-12-475) | 1.0 | 1.1 | 1.0 | 1.1 | 1.6 | 1.0 | 1.1 |
| Xanthan Gum (R-12-730) | 1.0 | 1.9 | 1.7 | 1.3 | 2.0 | 1.7 | 1.6 |
| CMC (R-11-814) | 1.0 | 1.8 | 1.6 | 1.5 | 2.2 | 1.6 | 1.6 |
| CMC (R-12-1182) | 1.0 | 1.8 | 1.7 | 1.6 | 2.1 | 1.7 | 1.7 |
| CMC (R-12-1173) | 1.0 | 1.3 | 1.9 | 1.4 | 2.5 | 1.9 | 1.7 |
| CMC (R-12-857) | 1.0 | 2.1 | 1.8 | 1.2 | 2.4 | 1.8 | 1.7 |
| Guar (R-10-938) | 1.2 | 2.1 | 1.3 | 2.3 | 2.5 | 1.3 | 1.8 |
| Guar (R-10-940) | 1.1 | 1.4 | 1.7 | 2.6 | 2.1 | 1.7 | 1.8 |
| Guar (R-13-003) | 1.0 | 2.2 | 1.7 | 1.6 | 2.3 | 1.7 | 1.8 |
| Guar (R-12-1109) | 1.1 | 1.3 | 2.0 | 2.4 | 2.5 | 2.0 | 1.9 |
| Guar (R-12-1110) | 1.4 | 1.6 | 2.1 | 2.5 | 2.5 | 2.1 | 2.0 |

-continued

| Clumping formula #3 w/1.5% clumping additive | initial reg. | initial ext. | AVERAGE |
|---|---|---|---|
| Xanthan Gum (R-12-475) | 1.0 | 1.0 | 1.0 |
| CMC (R-12-857) | 1.0 | 1.1 | 1.0 |
| CMC (R-12-1173) | 1.0 | 1.1 | 1.0 |
| CMC (R-11-814) | 1.0 | 1.1 | 1.0 |
| Guar (R-13-003) | 1.0 | 1.1 | 1.0 |
| CMC(R-12-1182) | 1.0 | 1.2 | 1.1 |
| Xanthan Gum (R-12-730) | 1.0 | 1.5 | 1.3 |
| Guar (R-12-1110) | 1.0 | 2.3 | 1.7 |
| Guar (R-10-938) | 1.0 | 2.4 | 1.7 |
| Guar (R-12-1109) | 1.0 | 2.4 | 1.7 |
| Guar (R-10-940) | 1.0 | 2.5 | 1.8 |

| Clumping formula #2 with 0.25% dumping additive | initial reg. | initial ext. | AVERAGE |
|---|---|---|---|
| CMC (R-12-1173) | 1.0 | 1.0 | 1.0 |
| Guar (R-10-938) | 1.0 | 1.0 | 1.0 |
| CMC (R-11-814) | 1.0 | 1.0 | 1.0 |
| Xanthan Gum (R-12-475) | 1.0 | 1.0 | 1.0 |
| CMC (R-12-1182) | 1.0 | 1.1 | 1.0 |
| Guar (R-12-1110) | 1.0 | 1.1 | 1.1 |
| Xanthan Gum(R-12-730) | 1.0 | 1.1 | 1.1 |
| CMC (R-12-857) | 1.0 | 1.1 | 1.1 |
| Guar (R-12-1109) | 1.0 | 1.1 | 1.1 |
| Guar (R-10-940) | 1.0 | 1.2 | 1.1 |
| Guar (R-13-003) | 1.0 | 1.3 | 1.1 |

Dust Data:

| | Dust reading | | | Dust index | | |
|---|---|---|---|---|---|---|
| | Clumping formula #1 | Clumping formula #3 | Clumping formula #2 | Clumping formula #1 | Clumping formula #3 | Clumping formula #2 |
| CMC (R-12-857) | 475 | 493 | 492 | 0.3 | 0.1 | 0.1 |
| CMC (R-12-1173) | 459 | 493 | 492 | 0.5 | 0.1 | 0.1 |
| Guar (R-10-940) | 453 | 487 | 491 | 0.6 | 0.2 | 0.1 |
| Guar (R-10-938) | 431 | 463 | 485 | 0.9 | 0.5 | 0.2 |
| CMC (R-12-1182) | 462 | 489 | 493 | 0.5 | 0.1 | 0.1 |
| CMC (R-11-814) | 426 | 483 | 488 | 1.0 | 0.2 | 0.2 |
| Guar (R-12-1109) | 429 | 462 | 487 | 1.0 | 0.5 | 0.2 |
| Guar (R-12-1110) | 424 | 456 | 482 | 1.0 | 0.6 | 0.2 |
| Guar (R-13-003) | 474 | 489 | 489 | 0.3 | 0.1 | 0.1 |
| Xanthan Gum (R-12-730) | 444 | 483 | 493 | 0.7 | 0.2 | 0.1 |
| Xanthan Gum (R-12-475) | 397 | 464 | 488 | 1.4 | 0.5 | 0.2 |

The invention is further described by the following numbered paragraphs:

1. A clumping cat litter comprising sodium carboxymethylcellulose (CMC) and/or xanthan gum.
2. The litter of paragraph 1 wherein the litter comprises CMC and xanthan gum.
3. The litter of paragraph 1 or 2, wherein the CMC has a viscosity greater than or equal to 2000 cPs.
4. The litter of any one of paragraphs 1-3, wherein the CMC has an average particle size less than or equal to 188 microns.
5. The litter of any one of paragraphs 1-4, wherein the xanthan gum has a viscosity greater than or equal to 2000 cPs.
6. The litter of any one of paragraphs 1-5, wherein the xanthan gum has an average particle size of less than or equal to 54 microns.
7. The litter of any one of paragraphs 1-6, wherein the litter comprises bentonite-montmorillonite clay, attapulgite/palygorskite clay or opalaceous material.
8. The litter of any one of paragraphs 1-7, wherein the litter comprises sodium bentonite.
9. The litter of any one of paragraphs 1-8, wherein the litter comprises about 1% w/w CMC and/or 1% xanthan gum.
10. The litter of any one of paragraphs 1-8, wherein the litter comprises about 0.25% w/w CMC and/or 0.25% xanthan gum.
11. A method of creating or improving clumping in cat litter comprising adding sodium carboxymethylcellulose (CMC) and/or xanthan gum of any one of paragraphs 1-10 to the cat litter, wherein the clumping is created or improved as compared to a cat litter without sodium carboxymethylcellulose (CMC) and/or xanthan gum, wherein the cat litter with the CMC and/or xanthan gum of any one of paragraphs 1-10 has created or improved clump strength as compared to a cat litter without CMC and/or xanthan gum.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A clumping cat litter comprising:
   (a) clay material or non-clay material; and
   (b) about 0.10% to about 5.00% (w/w) of a clumping agent which consists of xanthan gum, sodium carboxymethyl cellulose or a mixture of the foregoing,
   wherein said xanthan gum has a viscosity greater than or equal to 2000 cPs and an average particle size of less than or equal to 54 microns, and said sodium carboxymethylcellulose has a viscosity greater than or equal to 2000 cPs and an average particle size of less than or equal to 188 microns.

2. The clumping cat litter of claim 1, which comprises clay material.

3. The clumping cat litter of claim 2, wherein the clay material is bentonite-montmorillonite clay, attapulgite/palygorskite clay or an opalaceous material clay.

4. The clumping cat litter of claim 2, wherein the clay material is a blend of clay materials.

5. The clumping cat litter of claim 4, wherein the blend of clay materials comprises sodium bentonite.

6. The clumping cat litter of claim 1, wherein the clumping agent consists of about 1% (w/w) xanthan gum, 1% (w/w) sodium carboxymethylcellulose, or a mixture of the foregoing.

7. The clumping cat litter of claim 1, wherein the clumping agent consists of about 0.25% (w/w) xanthan gum, 0.25% (w/w) sodium carboxymethylcellulose, or a mixture of the foregoing.

8. The clumping cat litter of claim 1, wherein the viscosity of said sodium carboxymethylcellulose is between about 2000 cPs to about 5710 cPs and the average particle size is between about 49 microns to about 65 microns.

9. The clumping cat litter of claim 1, wherein the viscosity of said xanthan gum is between about 2000 cPs to about 2930 cPs and the average particle size is less than or equal to 46 microns.

10. The clumping cat litter of claim 1 which comprises non-clay material and said non-clay material is wood fiber, cellulose, wheat, corn, paper or ash.

11. The clumping cat litter of claim 1, which consists essentially of
  (a) clay material or non-clay material;
  (b) about 0.10% to about 5.00% (w/w) of a clumping agent which consists of xanthan gum, sodium carboxymethylcellulose or a mixture of the foregoing; and
  (c) optionally, at least one additive, which is an odor control additive; an odor making agent; an emulsifier, a fixative, an indicator, a pesticide, an insecticide, a herbicide, an attractant, a repellant, a sanitizer, an emollient, a humectant, a desiccant, a dye, a pigment, or a mixture of any of the foregoing,
wherein said xanthan gum has a viscosity greater than or equal to 2000 cPs and an average particle size of less than or equal to 54 microns, and said sodium carboxymethylcellulose has a viscosity greater than or equal to 2000 cPs and an average particle size of less than or equal to 188 microns.

12. A method of creating or improving clumping in cat litter comprising clay material or non-clay material which comprises adding to said clay material or non-clay material about 0.10% to about 5.00% (w/w) of a clumping agent which consists of xanthan gum, sodium carboxymethyl cellulose or a mixture of the foregoing,
  wherein said xanthan gum has a viscosity greater than or equal to 2000 cPs and an average particle size of less than or equal to 54 microns, and said sodium carboxymethylcellulose has a viscosity greater than or equal to 2000 cPs and an average particle size of less than or equal to 188 microns, and
  wherein the clumping strength is created or improved as compared to a cat litter wherein the clumping agent does not consist of xanthan gum, sodium carboxymethylcellulose or a mixture of the foregoing.

13. The method of claim 12, wherein the clumping cat litter comprises clay material.

14. The method of claim 13, wherein the clumping cat litter wherein the clay material is bentonite-montmorillonite clay, attapulgite/palygorskite claim or an opalaceous material clay.

15. The method of claim 12, wherein the clumping cat litter is a blend of clay materials.

16. The method of claim 15 wherein clumping cat litter of claim 15, wherein the blend of clay materials comprises sodium bentonite.

17. The method of claim 12 wherein, wherein the clumping agent consists of about 1% (w/w) xanthan gum, 1% (w/w) sodium carboxymethylcellulose, or a mixture of the foregoing.

18. The method of claim 12, wherein the clumping agent consists of about 0.25% (w/w) xanthan gum, 0.25% (w/w) sodium carboxymethylcellulose, or a mixture of the foregoing.

19. In a method of preparing an improved clumping cat litter comprising clay material or non-clay material, the improvement which comprises adding to said clay material or non-clay material about 0.10% to about 5.00% (w/w) of a clumping agent which consists of xanthan gum, sodium carboxymethyl cellulose or a mixture of the foregoing,
  wherein said xanthan gum has a viscosity greater than or equal to 2000 cPs and an average particle size of less than or equal to 54 microns, and said sodium carboxymethylcellulose has a viscosity greater than or equal to 2000 cPs and an average particle size of less than or equal to 188 microns.

* * * * *